UNITED STATES PATENT OFFICE.

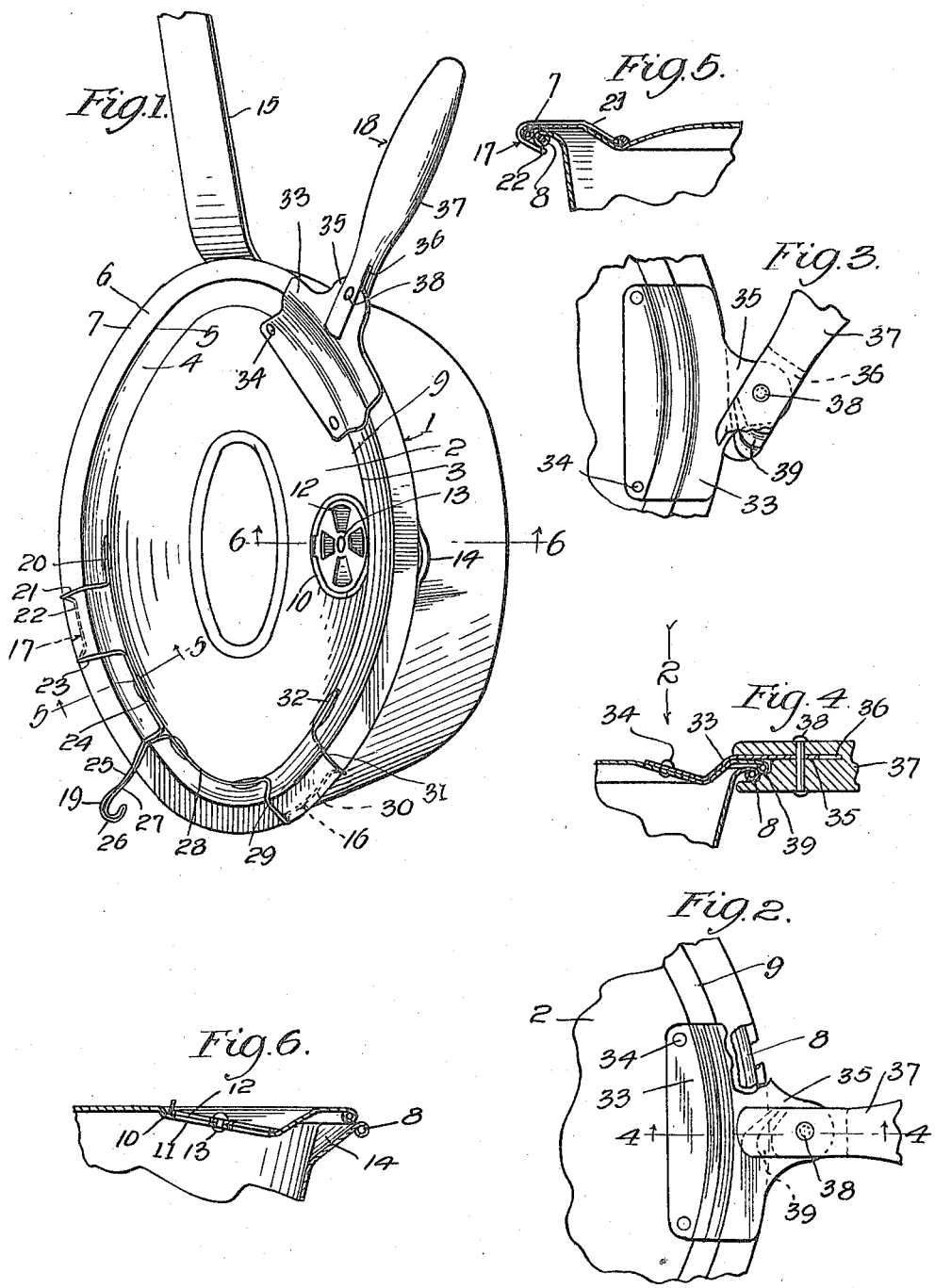

VIRGINIA EDWARDS, OF LOS ANGELES, CALIFORNIA.

KETTLE-LID.

1,187,721.　　　　Specification of Letters Patent.　　Patented June 20, 1916.

Application filed February 10, 1915. Serial No. 7,284.

*To all whom it may concern:*

Be it known that I, VIRGINIA EDWARDS, a citizen of the United States, residing at Los Angeles, in the county of Los Angeles and State of California, have invented a new and useful Kettle-Lid, of which the following is a specification.

My object is to make a kettle lid which may be clamped to a cooking receptacle, said kettle lid having a handle which serves as a secondary handle for manipulating the cooking utensil and said kettle lid having a steam vent with an adjustable damper, said steam vent being near the edge so as to serve as a drain, and my invention consists of the novel features herein shown, described and claimed.

Figure 1 is a perspective of a stew pan with a kettle lid embodying the principles of my invention in position for use. Fig. 2 is a fragmentary top plan view showing the details of connecting the handle to the lid, as indicated by the arrow 2 in Fig. 4. Fig. 3 is a fragmentary view analogous to Fig. 2 and illustrating the operation in Fig. 2, the handle being in its gripping position and in Fig. 3 the handle being in position to release the lid from the kettle. Fig. 4 is a fragmentary vertical sectional detail on the line 4—4 of Fig. 2. Fig. 5 is a fragmentary vertical sectional detail on the line 5—5 of Fig. 1. Fig. 6 is a fragmentary vertical sectional detail on the line 6—6 of Fig. 1.

The body 1 of the kettle lid comprises a central portion 2 which is convex, said central portion 2 extending to the line 3. From the line 3 surrounding the central portion 2 is an inclined portion 4 extending to the line 5. The rim 6 extending outwardly from the line 5 is flat and terminates in a small bead or wired edge 7. The rim 6 fits upon the rim 8 of the cooking utensil. The bead 7 being outside of the rim 8. The line 3 is the bottom of a circular trough 9 which extends entirely around the lid inside of rim 6. The damper seat 10 is stamped into the central portion 2 of the lid, the edge of the damper seat extending to the line 3, there being perforations 11 through the material of the lid which may be covered or uncovered by the perforated damper 12 mounted to rotate upon spindle 13. The perforations 11 when open provide a steam vent for the cooking utensil and also provide a drain, and when it is desired to increase the resistance of the steam or to increase the pressure within the utensil, damper 12 may be closed to the desired extent.

In applying the lid to the cooking utensil I prefer to have the damper 12 in line with the spout 14 of the cooking utensil, so that the drainage from the damper will unite with the drainage from the spout.

In the stew pan shown in Fig. 1 the spout 14 is at right angles to the handle 15.

In providing means for clamping the lid thus constructed to the cooking utensil, I provide two hooks 16 and 17 at the further side of the lid from the handle 15 and a clamping handle 18 opposite the hooks, and I provide a hook 19 for hanging the lid up out of use. While I have shown a stew pan as in Fig. 1, it is to be understood that the lid may be applied to any similar form of cooking utensil or to a kettle having a bail.

In the construction shown the clamping hooks 16 and 17 and the hanging hook 19 are all formed of a single piece of wire comprising the attaching portion 20 fitting in the trough 9 and soldered, the portion 21 extending radially outwardly from the portion 20 over and under the rim 6, the portion 22 extending concentrically from the outer end of the portion 21, the portion 23 extending from the opposite end of the portion 22 over the rim 6 to the trough 9, the portion 24 extending from the inner end of the portion 23 along the trough 9 and soldered in the trough, the portion 25 extending outwardly beyond the rim 6, the portion 26 at the outer end of the portion 25, the portion 27 extending backwardly along the portion 25 to the trough 9, the portion 28 extending along the trough 9 and soldered, the portion 29 extending outwardly across the rim 6 and downwardly, portion 30 extending from the outer end of the portion 29 concentrically, the portion 31 extending backwardly across the rim 26 and the portion 32 extending along the trough 9 and soldered. The portions 22 and 30 of the wire form the points of the hook and engage under the rim 8 of the kettle as shown in Fig. 5, and said hooks are V shaped in elevation so as to draw the lid tightly upon the rim.

The details of the handle 18 are as follows: The attaching plate 33 is secured to the lid by rivets 34 and by solder. The ear 35 of the attaching plate extending beyond the periphery of the lid and the material of the plate 33 is pressed to fit into trough 9. Slit 36 is formed from the end of the wooden handle 37 and the ear 35 is inserted into this slit and secured by the pivot pin 38. The eccentric cam 39 is formed upon the end face of the wood 37 below the slit 36, said cam being so formed that when the handle is turned to the right as in Fig. 3 the lid may be inserted upon or removed from the utensil and so that when the handle is turned to a radial line as in Figs. 1 and 2 the cam 39 will engage under the rim 8 and securely clamp the lid in place.

I prefer to construct the lid so that the handle 18 will come upon the left hand side and near to the handle 15, and when the lid is securely clamped in place upon a kettle of potatoes, for instance, the handle 18 of the lid becomes a secondary handle for manipulating the kettle in draining potatoes and the like. In other words, the operator will grasp the handle 15 with the right hand and the handle 18 with the left hand and use the handle 18 in tilting the kettle to drain the potatoes.

The details of construction may be varied in many ways without departing from the spirit of my invention, as set up in the following claims.

I claim:

1. A kettle lid comprising a suitable cover body, clamping hooks and a hanging hook secured to the cover body, and a clamping handle secured to the cover body opposite the clamping hooks.

2. A kettle lid comprising a cover body, clamping hooks and a hanging hook secured to the cover body; said clamping hooks and hanging hook being formed of wire bent to form attaching portions fitting the cover body, clamping hook portions extending outwardly and downwardly and backwardly from the attaching portions and a hanging hook portion extending outwardly from the attaching portions, said attaching portions being soldered to the cover body.

3. A kettle lid comprising a circular cover body, clamping hooks extending from the cover body, and a clamping handle extending from the cover body opposite the clamping hooks; said clamping handle comprising an attaching plate secured to the cover body and having an ear extending beyond the cover body, a handle having a slit in which the ear fits, a pivot extending through the handle and ear, and an eccentric cam upon the end face of the handle below the ear.

VIRGINIA EDWARDS.

Witnesses:
GRACE DODGE NAQUIN,
SEMER G. WELLS.

Copies of this patent may be obtained for five cents each, by addressing the "Commissioner of Patents, Washington, D. C."